(12) United States Patent
Hahn et al.

(10) Patent No.: US 8,879,210 B1
(45) Date of Patent: Nov. 4, 2014

(54) DSA SUSPENSION WITH MICROACTUATORS EXTENDING TO GIMBAL THROUGH FLEXIBLE CONNECTORS

(71) Applicant: Magnecomp Corporation, Murrieta, CA (US)

(72) Inventors: Peter Hahn, Wildomar, CA (US); Kuen Chee Ee, Chino, CA (US); Long Zhang, Murrieta, CA (US)

(73) Assignee: Magnecomp Corporation, Murrieta, CA (US)

( * ) Notice: Subject to any disclaimer, the term of this patent is extended or adjusted under 35 U.S.C. 154(b) by 23 days.

(21) Appl. No.: 13/684,016

(22) Filed: Nov. 21, 2012

Related U.S. Application Data

(60) Provisional application No. 61/565,349, filed on Nov. 30, 2011.

(51) Int. Cl.
*G11B 5/48* (2006.01)
*G11B 21/21* (2006.01)

(52) U.S. Cl.
CPC ................................ *G11B 21/21* (2013.01)
USPC .................................................... 360/245.3

(58) Field of Classification Search
CPC ........................... G11B 5/5552; G11B 5/4833
USPC .......... 360/294.3, 294.4, 294.6, 245.3, 245.7, 360/245.9
See application file for complete search history.

(56) References Cited

U.S. PATENT DOCUMENTS

| | | | |
|---|---|---|---|
| 6,069,771 A | 5/2000 | Boutaghou et al. |
| 6,078,473 A | 6/2000 | Crane et al. |
| 6,222,706 B1 | 4/2001 | Stefansky et al. |
| 6,297,936 B1 | 10/2001 | Kant et al. |
| 6,327,120 B1 | 12/2001 | Koganezawa et al. |
| 6,359,758 B1 | 3/2002 | Boutaghou |
| 6,376,964 B1 | 4/2002 | Young et al. |
| 6,512,659 B1 | 1/2003 | Hawwa et al. |
| 6,549,375 B1 | 4/2003 | Crane et al. |
| 6,597,539 B1 | 7/2003 | Stupp et al. |
| 6,618,220 B2 | 9/2003 | Inagaki et al. |
| 6,621,661 B1 | 9/2003 | Ichikawa et al. |
| 6,738,231 B2 | 5/2004 | Arya et al. |
| 6,760,196 B1 | 7/2004 | Niu et al. |
| 6,785,096 B2 | 8/2004 | Kuwajima et al. |
| 6,831,807 B2 | 12/2004 | Koso et al. |
| 6,917,498 B2 | 7/2005 | Kuwajima et al. |
| 6,939,667 B2 | 9/2005 | Taima |
| 6,952,330 B1 | 10/2005 | Riddering et al. |
| 6,961,221 B1 | 11/2005 | Niu et al. |
| 7,005,304 B2 | 2/2006 | Nakatani et al. |
| 7,006,333 B1 | 2/2006 | Summers |

(Continued)

*Primary Examiner* — Angel Castro
(74) *Attorney, Agent, or Firm* — Intellectual Property Law Offices of Joel Voelzke, APC

(57) ABSTRACT

A dual stage actuated (DSA) suspension includes two PZT microactuators that are attached at their first ends to a non-gimbaled portion of the suspension such as the portion of the flexure that is rigidly attached to the load beam, and are attached at their second ends to the gimbaled portion of the suspension such as the gimbal tongue through flexible connectors that can be formed integrally with the suspension's flexure. The flexible connectors are flexible enough so as not to interfere with the suspension's gimballing action. The flexible connectors transmit force from the PZTs to the gimbal as the PZTs expand and contract in order to rotate the gimbal and thus effect fine movements of the head slider.

20 Claims, 7 Drawing Sheets

Top Plan View

(56) References Cited

U.S. PATENT DOCUMENTS

| | | | |
|---|---|---|---|
| 7,006,335 B2 | 2/2006 | Kuwajima et al. | |
| 7,027,267 B2 | 4/2006 | Kuwajima et al. | |
| 7,046,485 B2 | 5/2006 | Kuwajima et al. | |
| 7,046,486 B1 | 5/2006 | Coffey | |
| 7,050,266 B2 | 5/2006 | Ichikawa et al. | |
| 7,050,271 B2 | 5/2006 | Miyano et al. | |
| 7,072,149 B2 | 7/2006 | Kuwajima et al. | |
| 7,072,150 B2 | 7/2006 | Kuwajima et al. | |
| 7,106,557 B2 | 9/2006 | Kuwajima et al. | |
| 7,161,765 B2 | 1/2007 | Ichikawa et al. | |
| 7,230,800 B2 | 6/2007 | Hirano et al. | |
| 7,298,593 B2 | 11/2007 | Yao et al. | |
| 7,312,955 B2 | 12/2007 | Kuwajima et al. | |
| 7,365,930 B2 | 4/2008 | Ishii et al. | |
| 7,375,930 B2 * | 5/2008 | Yang et al. | 360/294.4 |
| 7,382,583 B2 | 6/2008 | Hirano et al. | |
| 7,403,357 B1 | 7/2008 | Williams | |
| 7,551,405 B2 | 6/2009 | Yao et al. | |
| 7,609,487 B2 | 10/2009 | Yao et al. | |
| 7,684,158 B1 | 3/2010 | Lauer | |
| 7,706,105 B2 | 4/2010 | Maslov et al. | |
| 7,839,604 B1 | 11/2010 | Koffey et al. | |
| 7,843,666 B2 * | 11/2010 | Yao et al. | 360/245.3 |
| 7,881,017 B2 | 2/2011 | Bhatia et al. | |
| 8,085,508 B2 | 12/2011 | Hatch | |
| 8,089,732 B2 * | 1/2012 | Yao et al. | 360/245.3 |
| 8,094,416 B2 | 1/2012 | Hanya et al. | |
| 8,098,461 B2 | 1/2012 | Nojima et al. | |
| 8,130,469 B2 * | 3/2012 | Yao | 360/245.3 |
| 8,134,809 B2 | 3/2012 | Yao et al. | |
| 8,446,694 B1 * | 5/2013 | Tian et al. | 360/245 |
| 2011/0096438 A1 | 4/2011 | Takada et al. | |
| 2014/0104722 A1 * | 4/2014 | Wright et al. | 360/75 |
| 2014/0168813 A1 * | 6/2014 | Tao et al. | 360/75 |
| 2014/0168815 A1 * | 6/2014 | Kudo | 360/99.08 |

\* cited by examiner

Top Plan View

Bottom Plan View

Bottom Plan View

DSA SUSPENSION WITH MICROACTUATORS EXTENDING TO GIMBAL THROUGH FLEXIBLE CONNECTORS

CROSS-REFERENCE TO RELATED APPLICATIONS

This application claims benefit of U.S. Provisional Patent Application No. 61/535,349 filed Nov. 30, 2011, which is hereby incorporation by reference as if set forth fully herein.

BACKGROUND OF THE INVENTION

1. Field of the Invention

This invention relates to the field of dual stage actuator (DSA) type suspensions for disk drives including hard disk drives. More particularly, this invention relates to the field of a dual stage actuator suspension in which the microactuators are connected to the gimbaled region through flexible connectors.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest to base plate 12 which is swaged or otherwise mounted to an actuator arm. The "distal" end of a suspension or load beam is the end that is opposite the proximal end, i.e., the "distal" end is the cantilevered end.

Suspension 105 is coupled to an actuator arm 103, which in turn is coupled to a voice coil motor 112 that moves the suspension 105 in an arc in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider and to keep it properly aligned over the desired data track on the spinning disk. The microactuator(s) provide much finer control and increased bandwidth of the servo control loop than does the voice coil motor alone, which only effects relatively coarse movements of the suspension and hence the magnetic head slider. Various locations have been proposed for the microactuator(s). The PZTs can be located within baseplate 105, on the load beam 107, or at or near the head gimbal assembly which is located at the distal end of load beam 107. Mei FIGS. 1 and 10 show embodiments in which the microactuators extend from the mount plate, and in which the microactuators are mounted in the middle of the load beam, respectively. Patent publication no. US2001/0096438 by Takada et al. and US2009/0244786 by Hatch show DSA suspensions in which the microactuator are located on the gimbal. U.S. Pat. No. 6,760,196 to Niu et al. shows a collocated microactuator, i.e., a microactuator that lies directly underneath the head slider. U.S. Pat. No. 6,376,964 to Young at al. shows microactuators that bend from side to side and that extend from the distal end of the suspension to the gimbal to effect fine movements of the slider through a hinged linkage structure.

FIG. 2 is a top plan view of the prior art DSA suspension 105 of FIG. 1. Microactuators 14, which are usually but not necessarily piezoelectric (PZT) devices, are mounted on microactuator mounting shelves 16 that are formed in mount plate 12. Microactuators 14 span gap 18.

DSA suspensions having the microactuators on the mount plate such as in FIG. 2 generally have high stroke length per unit of input voltage. This will be referred to simply as having high stroke length for shorthand. Such suspensions, however, usually suffer from low servo bandwidth due to resonances in the part of the suspension that is distal to the PZTs. Slider based (collocated) DSA suspension designs variously have the disadvantages of: requiring additional piece parts; requiring complicated tracing routing, electrical connections, and slider bonding; having heavy slider/tongue assemblies which is undesirable because the extra mass can affect dynamic performance especially under shock conditions; and requiring one or more dedicated tongue features that are prone to manufacturing tolerance issues. Other gimbal-based designs require thin-film PZTs for high stroke lengths, and/or can be difficult to adjust for pitch and roll static attitude.

In the discussion which follows, the microactuator(s) will be referred to as two PZTs for shorthand, although it will be understood that the invention applies equally to suspensions having only a single microactuator and/or microactuator(s) that are not necessarily PZT devices.

SUMMARY OF THE INVENTION

The present invention is of a DSA suspension have one or more PZTs that extend from the load beam, or more generally from a non-gimbaled portion of the suspension, and more specifically from a non-gimbaled or rigid portion of the flexure, to a gimbaled part of the suspension such as the slider tongue. The PZTs are connected to the gimbaled portion through thin ribbons of stainless steel and/or other materials that act as flexible connectors to transmit tensile and compressive forces, and thereby transmit push/pull movement of the PZTs, to the gimbaled portion to which the head slider is attached, the connectors being flexible enough to allow the gimbal to pitch and roll relatively freely and thus not interfere with the normal gimbal action as the head slider pitches and rolls in response to surface irregularities in the surface of the data disk, which is necessary for proper gimbal and suspension operation. The invention provides a DSA suspension with good stroke length per unit of input voltage to the PZTs, high servo bandwidth, and good shock susceptibility. The PZTs can be relatively inexpensive single-layer bulk PZTs as compared to more costly PZT configurations such as thin-film or multilayer PZTs which are called for in some prior designs.

In one aspect therefore, the invention is of a dual stage actuator (DSA) type suspension for a disk drive, the suspension including a load beam and a flexure, the flexure having a rigid part that is secured to the load beam and a gimbaled part that is allowed to pitch and roll freely via gimballing action, a pair of linear actuators such as bulk piezoelectric (PZT)

devices attached at one end thereof to the rigid part of the flexure or other rigid part of the load beam and being attached at opposite ends to the gimbaled part through ribbon-like flexible connectors. The flexible connectors can be ribbon-like pieces of stainless steel that are formed integral with the flexure, so as to be extensions that extend from the gimbaled portion to the PZTs. When one PZT contracts and the other expands, the PZT that contracts pulls on one flexible connector, while the PZT that expands pushes on the flexible connector. Those tensile and compressive forces, respectively, pull and push the slider tongue in push/pull fashion to cause the gimbal tongue and hence the slider which is mounted thereon to rotate, thus realizing the desired fine movements of the slider over the data disk. The flexible connectors are strong enough in compression so as to not significantly buckle, thus allowing the PZTs to push on the slider tongue through the flexible connectors. At the same time, the ribbon-like connectors are flexible enough so that they do not significantly interfere with the gimballing action, thus allowing the gimbal to pitch and roll freely per the usual gimballing action of a suspension, and allowing the slider tongue to rotate in response to the push/pull action that the flexible connectors exert on the slider tongue.

Additionally, the PZTs are mounted at a slight angle with respect to the central longitudinal axis of the suspension. The gimbal includes outer gimbal struts, and bridge struts extending from and connecting the outer gimbal struts to the flexible connectors. The bridge struts connect to the flexible connectors at a position that substantially eliminates transverse (side-to-side) force on the slider tongue and hence substantially eliminates linear transverse motion of the slider as the slider rotates. This greatly decreases fretting wear on the dimple, which is of concern because fretting of the dimple produces particle shed, which particles can contaminate the disk drive and can even cause catastrophic head crashes.

The invention presents several advantages over various prior art DSA suspensions. In comparison to gimbal mounted PZT designs, because the PZTs of the present invention are attached at one end to a rigid part of the suspension, the design allows for higher stroke length (movement of the slider per voltage of input applied to the PZTs). The present design can also accommodate longer PZTs, and hence greater stroke, than certain prior art designs. Additionally, the PZTs are located far away from the slider compared to certain gimbal-mounted prior art designs. This improves shock lift-off performance, i.e., the amount of shock as measured in g-forces that the suspension can sustain in operation before the head slider lifts off the disk platter or crashes into the disk platter. Additionally, because of their stroke efficiency, single layer bulk parts can be used in the design instead of multi-layer bulk PZTs or thin film PZTs which are more expensive.

Exemplary embodiments of the invention will be described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION

For discussion purposes, the present disclosure will refer to the microactuator as being "PZTs," although it will be understood that other types of microactuators could be used as well, and thus the invention is applicable to DSA suspensions using other types of micro actuators.

Figure 1:
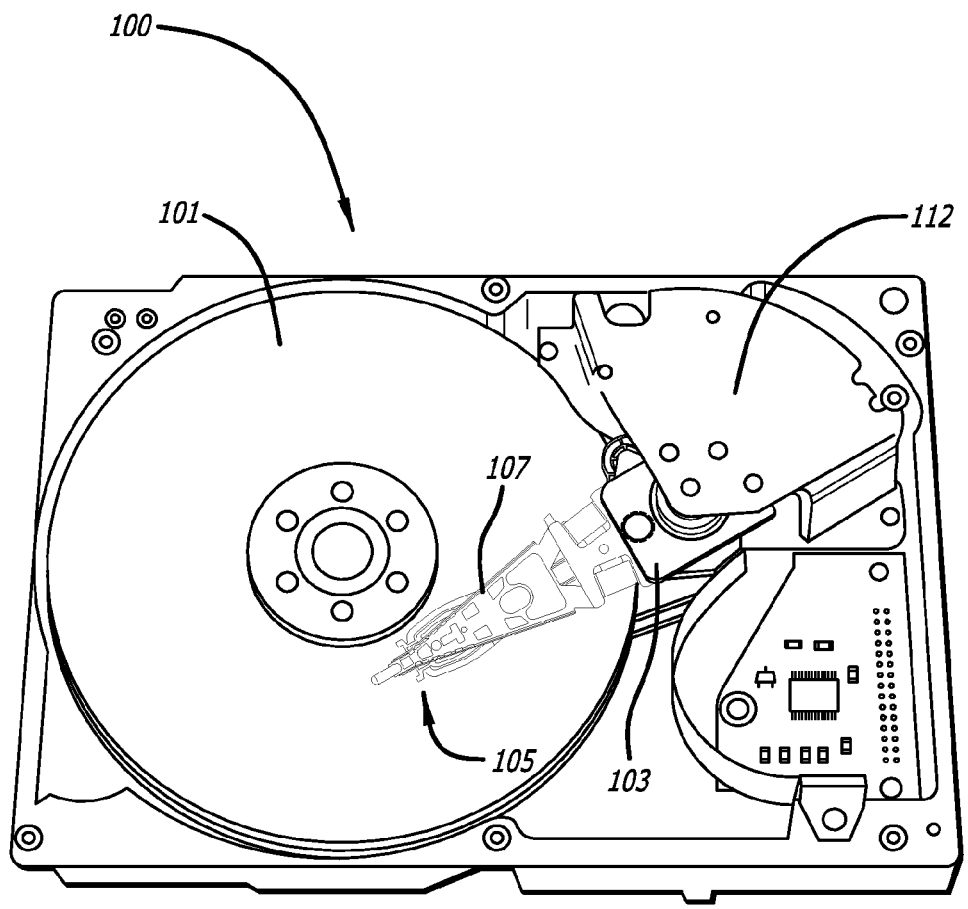
FIG. 1 is an oblique view of a prior art hard disk drive assembly with a DSA suspension.
Figure 2:
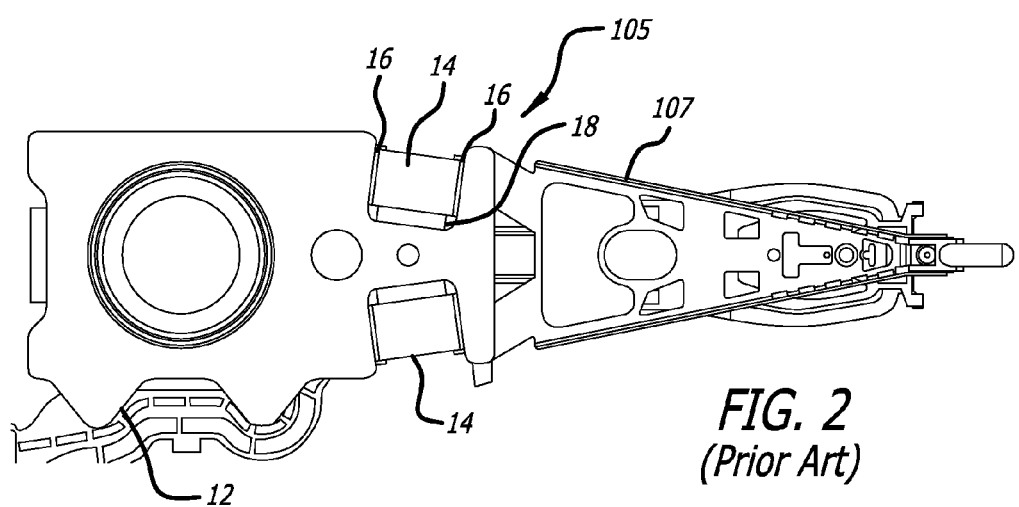
FIG. 2 is a top plan view of the prior art suspension 105 of FIG. 1.
Figure 3:
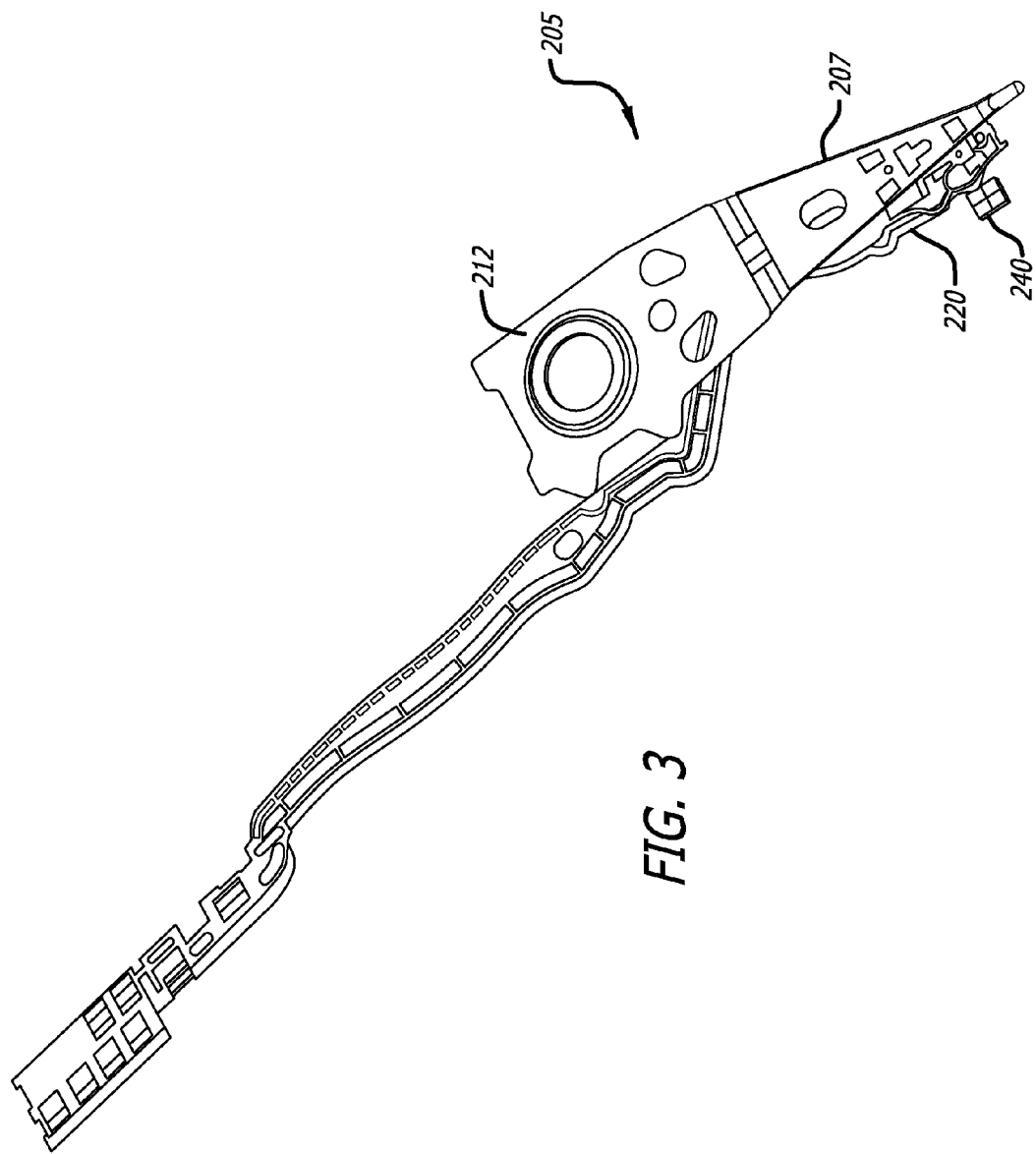
FIG. 3 is an oblique, partially exploded view of a DSA suspension according to an illustrative embodiment of the invention.

FIG. 3 is an oblique, partially exploded view of a DSA suspension according to an illustrative embodiment of the invention. Suspension 205 includes base plate 212, load beam 207, a flexure 220 welded or otherwise affixed to the load beam, and magnetic read/write head slider 240 affixed to the distal and gimbaled portion of flexure 220. For purposes of the present discussion, load beam 207 and the portion of flexure 220 rigidly affixed to load beam 207 will be referred to as being rigid or non-gimbaled.

Figure 4:
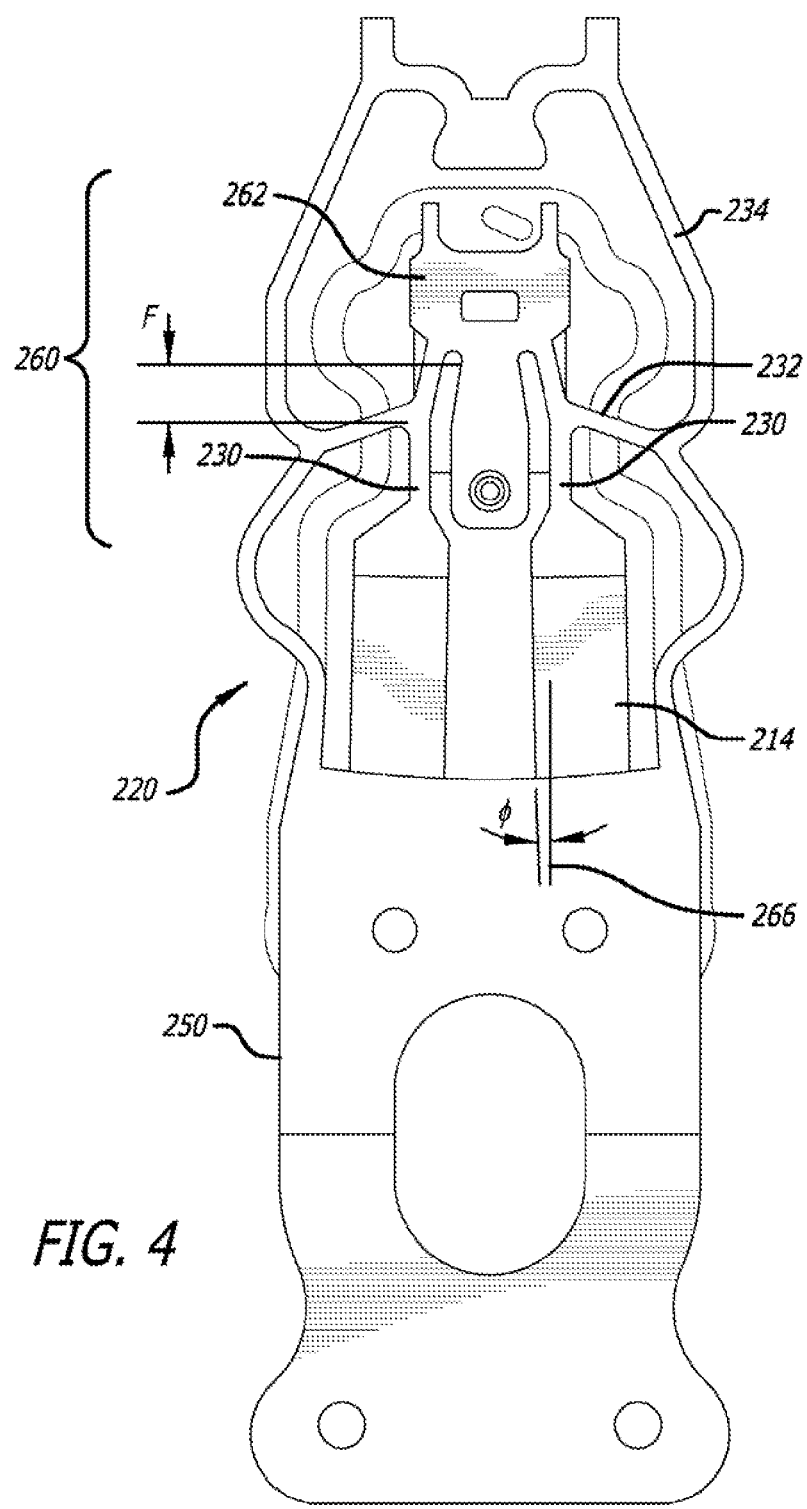
FIG. 4 is a top plan view of the flexure 220 of the suspension of FIG. 3, viewed from what is sometimes referred to as the "gimbal top."
Figure 5:
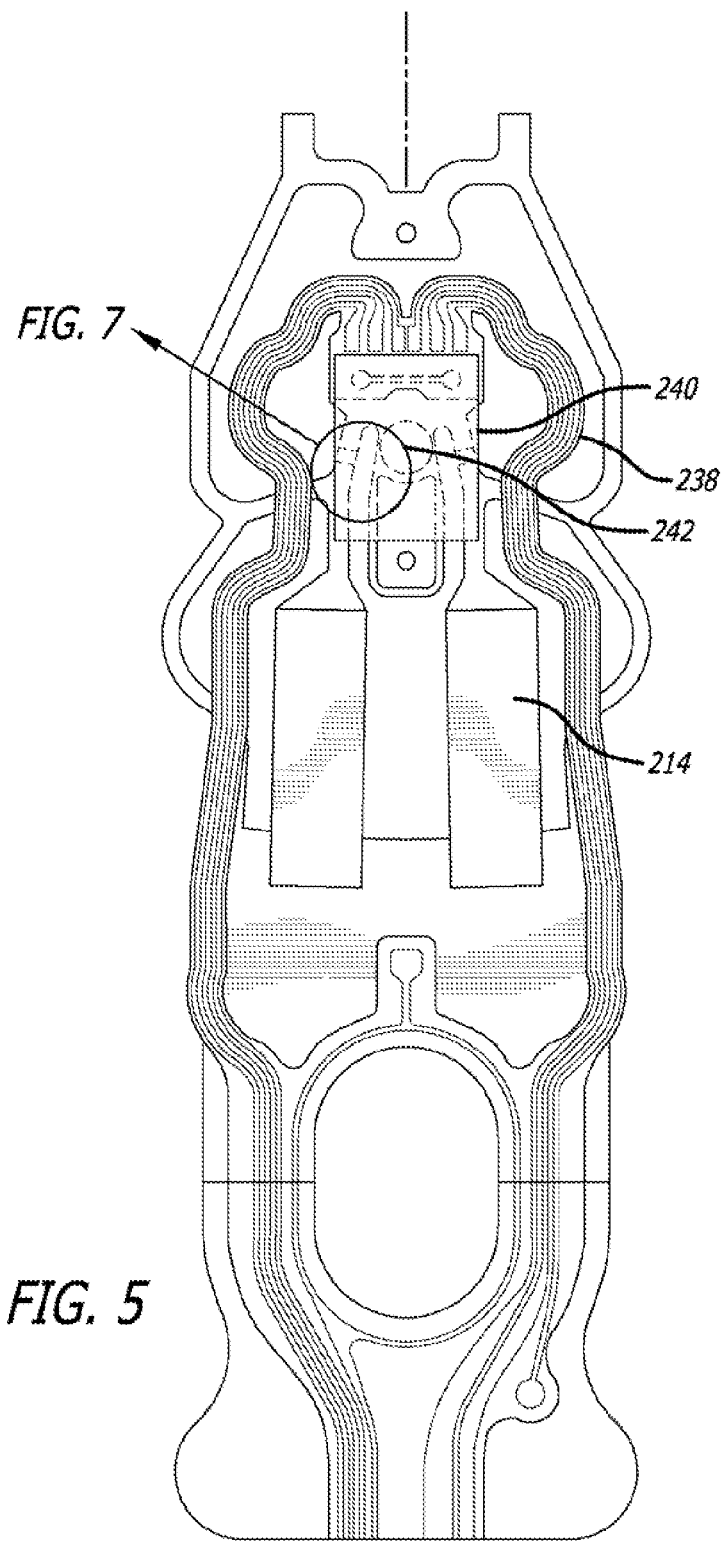
FIG. 5 is a bottom plan view of the flexure 220 of the suspension of FIG. 3, viewed from what is sometimes referred to as the "gimbal bottom."

FIG. 4 is a top plan view of the flexure 220 of the suspension of FIG. 3, viewed from what is sometimes referred to as the "gimbal top," and FIG. 5 is a bottom plan view of the flexure 220 of the suspension of FIG. 3, viewed from what is sometimes referred to as the "gimbal bottom." Flexure 220 typically includes rigid flexure base or non-gimbaled portion 250, a gimbaled portion 260 including slider tongue 262 to which a magnetic read/write head slider 240 is attached, a flexible electrical circuit 238, and a gimbal structure. The gimbal structure allows the gimbaled portion including slider tongue 262 to pitch and roll freely in response to surface irregularities in the data disk as the disk spins underneath slider 240. Slider 240 is supported for rotational movement in 3 degrees (pitch, roll, and yaw) by a dimple in load beam 207, at a location on load beam 207 that corresponds to dimple location 242 shown in FIG. 5. A number of various gimbal designs exist and are commercially used; in the illustrative embodiment shown, the gimbal takes the form of a ring gimbal including outer gimbal struts, or simply outer struts, 234. Bridge struts 232 connect from outer gimbal struts 234 to flexible connectors 230.

Flexible connectors 230 can be integrally formed with the rest of flexure 220. Flexible connectors 230 take the form of ribbon-like sections of the same stainless steel or other material from which flexure 220 is formed. Electrical circuit 238 which is formed as part of flexure 220 on the stainless steel substrate layer includes layers of an insulating material such as polyimide, copper alloy signal conductors on top of the polyimide, and an insulating and protective covercoat such as another insulative layer of polyimide over the copper signal conductors. Flexure 220 can be formed using either a subtractive process or an additive process. In an additive process, the layers are built up sequentially over the stainless steel layer into the patterns desired. In a subtractive process, the manufacture begins with a composite laminate of stainless steel/polyimide/copper and the various layers are selectively masked and etched away to form the desired flexure 220. Flexible connectors 230 may comprise only stainless steel over their whole lengths, or at least a majority of their lengths; they have no insulating material such as polyimide or copper for their entire lengths, or at least for a majority of their lengths. Alternatively, flexible connectors 230 may have insulating material such as polyimide on them so as to increase the stiffness of those connectors. The polyimide may be in controlled patterns on flexible connectors 230 so as to increase their stiffness to controlled extents at particular locations.

Flexible connectors 230 should be strong enough so that when pushed by a first PZT 214 in expansion, they do not buckle significantly. Rather, they transmit a compressive force to gimbaled portion 260. Meanwhile, the second PZT 214 contracts, pulling on its respective flexible connector. The two PZTs therefore operate in push-pull fashion to rotate slider tongue 262. At the same time, flexible connectors 230 should be sufficiently flexible so as to not interfere significantly with the gimballing action of the head slider 240, and allow the non-gimbaled portion 260 to rotate freely when PZTs 214 are actuated.

PZTs 214 or possibly some other type of microactuator are attached at their proximal ends to non-gimbaled flexure base 250, and at their distal ends are attached to flexible connectors 230 such as by either a solder or an epoxy, either non-conductive or conductive depending on whether electrical termination is to the stainless steel body of flexure 220 or to the flexible circuit 238.

Bridge struts 232 connect from outer gimbal struts 234 to flexible connectors 230 at a location that is a distance F distal of dimple center point dimple location 242. Distance F is preferably at least 0.05 mm, and preferably 0.05-0.25 mm. Other preferred dimensions are listed in provisional patent application No. 61/535,349 from which priority is claimed, and which is incorporated herein by reference. Additionally, PZTs 214 are mounted at a slight angle $\phi$ with respect to a central longitudinal axis 266 of the suspension, with the distal end of microactuators 214 being closer to central longitudinal axis 266 than the proximal ends of the microactuators. Preferably $\phi$ is at least 1 degree, and more preferably 2-12 degrees, and more preferably still about 2-4 degrees. The PZT line of action distance to dimple location can also influence both the stroke sensitivity and the dimple y-force.

The inventors discovered via analysis and extensive finite element analysis modeling that when the suspension is constructed according to the preferred dimensions, slider 240 experiences very little transverse (side-to-side) linear force and hence very little transverse movement when PZTs are actuated. Depending on the exact dimensions used for the flexure including the gimbal, the longitudinal distance F from the bridge strut connection point to the dimple location 242 can be adjusted to obtain negligible transverse linear force and movement of slider 240. The inventors were able to achieve a transverse force of <0.01% of the gram load of the suspension (i.e., <0.0002 gram for gram load of 2.0 gmf), and a transverse force of <0.01 gram per volt for each of the two microactuators. Since the design has low dimple y-force tendency, the contact friction force under the gram load (dimple contact force) is strong enough to hold the tongue and dimple together and act as a pivot (static friction condition, without sliding). Therefore, there is no significant transverse movement between dimple and tongue, and thus less fretting wear. By selecting the dimensions and angles properly, the designer can substantially eliminate transverse (side-to-side) force on the slider tongue and hence substantially eliminate linear transverse motion of the slider as the slider rotates. This greatly decreases fretting wear on the dimple.

Electrical connections from flexible circuit 238 to PZTs 214, and grounding of the PZTs through either electrical circuit 238 and/or to the stainless steel body of flexure 220, can be made by conventional methods that are well known, or by straightforward modifications to those methods. Examples of possible electrical connections are described in provisional patent application No. 61/535,349 from which priority is claimed, and which is incorporated herein by reference. Additional illustrative embodiments of the invention are also disclosed therein.

Figure 6:
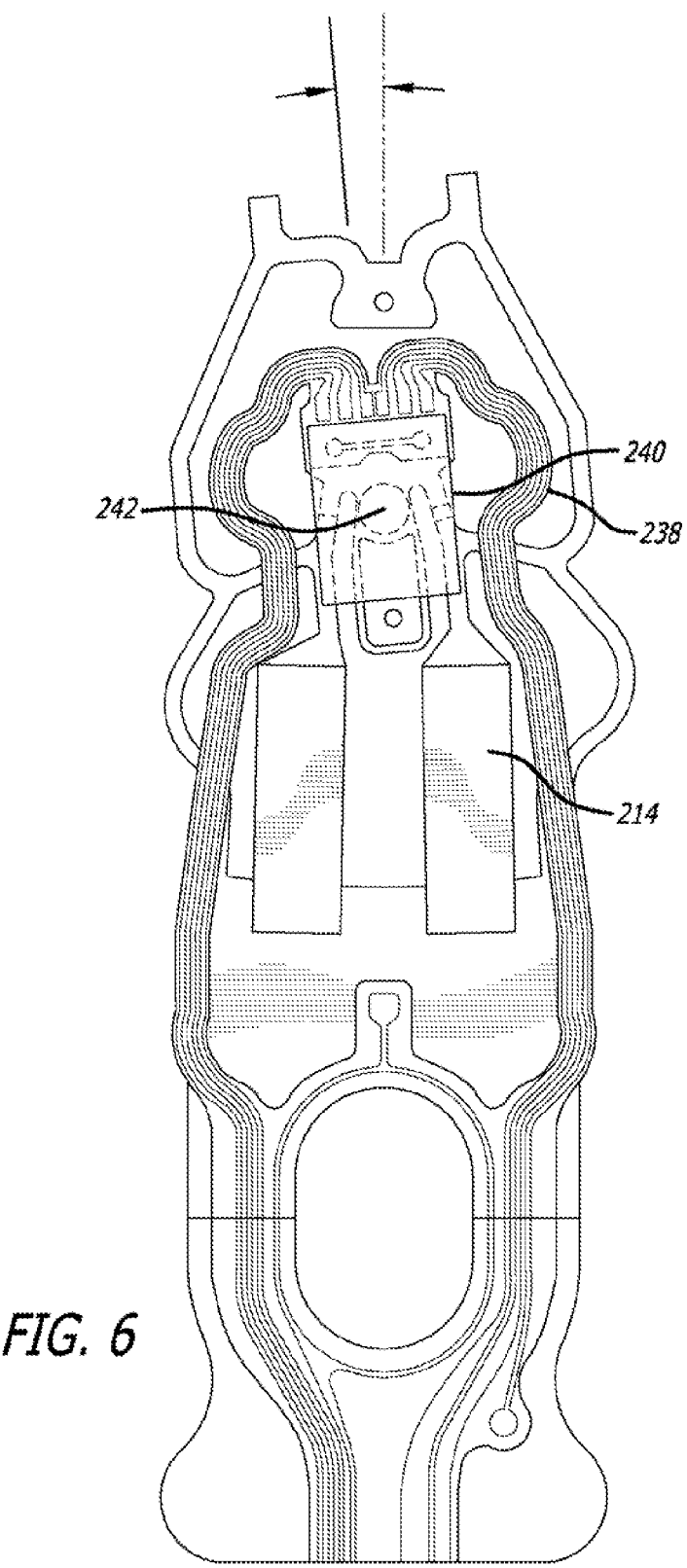
FIG. 6 is a bottom plan view of the flexure of FIG. 5 with the PZTs actuated in order to rotate the slider.

FIG. 6 is a bottom plan view of the flexure of FIG. 5 with the PZTs actuated and the slider 240 rotated by the action of the PZTs. Flexible connectors 230 are slightly bent, thereby allowing for the rotation. Slider 240 is essentially rotated in place about the dimple point with only negligible side-to-side linear movement, and thus experiences almost or essentially pure rotation about the dimple.

Figure 7:
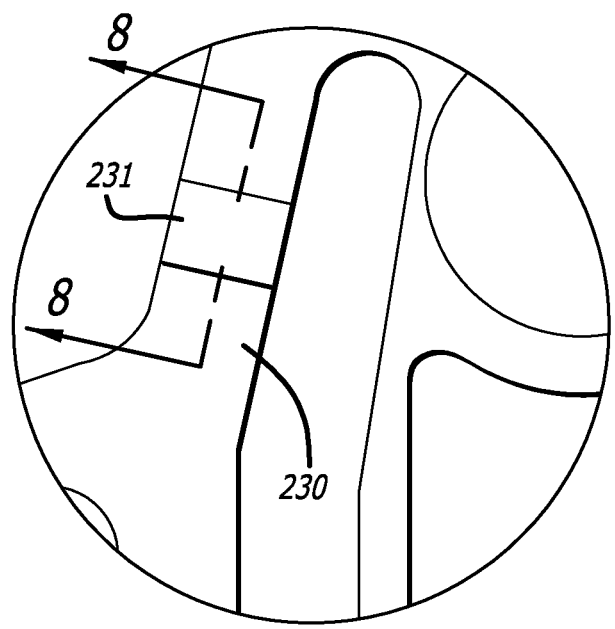
FIG. 7 is a close-up of the area around one of the flexible connectors 230 in FIG. 5.
Figure 8:
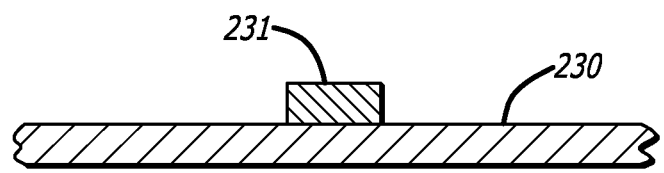
FIG. 8 is a cross section view taken alone section line 8-8' in FIG. 7.

FIG. 7 is a close-up of the area around one of the flexible connectors 230 in FIG. 5, and FIG. 8 is a cross section view taken alone section line 8-8' in FIG. 7, with slider 240 removed for clarity of illustration. Stainless steel flexible connector 230 has a dam 231 thereon. In the preferred embodiment, dam 231 is a dam of insulating material such as polyimide, defined by a raised mass of material. Polyimide dam 231 can be formed at the same time as the rest of the flexure is formed and does not require an additional manufacturing step. Raised dam 231 extends across the entire width, or substantially the entire width, of flexible connector 230. Polyimide dam 231 controls or stops the flow of slider adhesive from the slider area during manufacturing. More specifically, dam 231 helps to prevent the adhesive that is used to bond slider 240 to slider tongue 262 from wicking past dam 231, which could affect the mass, stiffness, and other characteristics of flexible connector 230 and/or bridge strut 232, and hence adversely affect the performance of the suspension.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, PZT microactuators have been proposed to be placed at locations on a suspension other than the gimbal region, and the invention should therefore not be considered to be limited to a DSA suspension having a co-located microactuator. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuator (DSA) type suspension for a disk drive, the suspension comprising:
   a load beam;
   a gimbaled portion including a head slider, the gimbaled portion being attached in gimbaled fashion to the load beam so that the head slider pitches and rolls freely in response to surface irregularities in a surface of a data disk as the data disk travels underneath the head slider;
   a linear microactuator having a first end and a second end opposite the first end, the linear microactuator being attached at its first end to a non-gimbaled portion of the suspension; and
   a flexible stainless steel connector having a first end and a second end, the first end of the flexible stainless steel connector being attached to the second end of the microactuator, and the second end of the flexible stainless steel connector being attached to the gimbaled portion of the suspension;
   wherein when the linear microactuator contracts, it pulls the flexible connector which in turn pulls the gimbaled portion thereby rotating the gimbaled portion to effect fine movements of the head slider, the flexible stainless steel connector being sufficiently flexible to allow the gimbaled portion to rotate.

2. The DSA suspension of claim 1 wherein the linear microactuator contracts in a direction that is generally parallel to a longitudinal axis of the suspension.

3. The DSA suspension of claim 1 wherein the flexible stainless steel connector is sufficiently flexible so as not to interfere significantly with the gimballing action of the head slider.

4. The DSA suspension of claim 1 wherein the suspension includes a flexure having the gimbaled portion, and wherein the flexible connector is formed integrally with the flexure.

5. The DSA suspension of claim 4 wherein the flexible stainless steel connector that is formed integrally with the flexure has no insulating material thereon.

6. The DSA suspension of claim 1 wherein the linear microactuator defines a first linear microactuator and the flexible stainless steel connector defines a first flexible stainless steel connector, the suspension further comprising:
   a second linear microactuator having a first end and a second end opposite the first end;
   the second linear microactuator being attached at its first end to the non-gimbaled portion of the suspension; and
   a second flexible stainless steel connector having a first end and a second end, the first end thereof being attached to the second end of the second microactuator, and the second end thereof being attached to the gimbaled portion of the suspension;
   wherein when the second linear microactuator contracts, it pulls the second flexible stainless steel connector which in turn pulls the gimbaled portion thereby rotating the gimbaled portion to effect fine movements of the head slider, the second flexible stainless steel connector being sufficiently flexible to allow the gimbaled portion to rotate.

7. The DSA suspension of claim 6 wherein the first and second flexible stainless steel connectors are sufficiently strong in compression such that when the first microactuator expands and the second microactuator contracts, the first flexible connector does not significantly buckle and exerts a pushing force on the gimbaled portion, whereby the two microactuators and their associated flexible stainless steel connectors operate in push/pull fashion to rotate the gimbaled portion.

8. The DSA suspension of claim 6 wherein:
   the suspension includes a dimple on which the head slider is supported;
   the gimbal includes a first outer strut;
   a first bridge strut connects from the first outer strut to the first flexible stainless steel connector at a first bridge strut connection point; and
   a longitudinal distance from the dimple to the first bridge strut connection point is within the range of 0.05 to 0.25 mm.

9. The DSA suspension of claim 6 wherein:
   the suspension includes a dimple on which the head slider is supported;
   the gimbal includes a first outer strut;
   a first bridge strut connects from the first outer strut to the first flexible stainless steel connector at a first bridge strut connection point; and
   a longitudinal distance from the dimple to the first bridge strut connection point is such that when the microactuators are activated by electrical voltages applied thereto, the slider experiences a transverse force of less than 0.01 gram per volt applied to each of the two microactuators.

10. The DSA suspension of claim 6 wherein:
    the suspension includes a dimple on which the head slider is supported;
    the gimbal includes a first outer strut;
    a first bridge strut connects from the first outer strut to the first flexible stainless steel connector at a first bridge strut connection point; and
    a longitudinal distance from the dimple to the first bridge strut connection point is such that when the microactuators are activated by electrical voltages applied thereto, the slider experiences rotation which limits the transverse force to less than 0.01% of a gram load of the suspension.

11. The DSA suspension of claim 1 wherein the flexible stainless steel connector has a dam formed thereon of insulating material for stopping a flow of adhesive used in mounting a slider to the suspension.

12. A dual stage actuator (DSA) type suspension for a disk drive, the suspension comprising:
    a load beam;
    a flexure connected to the load beam, the flexure having a rigid portion and a gimbaled portion to which a head slider is mounted;
    first and second microactuators attached at first ends thereof to the rigid flexure portion;
    first and second stainless steel ribbons connecting the microactuators at second ends thereof to the gimbaled flexure portion, such that when the first and second microactuators expand and contract, respectively, the stainless steel ribbons exert compressive and tensile forces, respectively, on the gimbaled flexure portion thereby effecting rotational movement of the head slider, the stainless steel ribbons being flexible enough to allow for said rotational movement of the head slider.

13. The DSA suspension of claim 12 wherein the first and second stainless steel ribbons have connected thereto first and second stainless steel bridge connectors, respectively, the bridge connectors connecting the stainless steel ribbons to respective outer gimbal struts.

14. The DSA suspension of claim 13 wherein the stainless steel bridge connectors are connected to the stainless steel ribbons at a position that is greater than 0.05 mm distal of a dimple center point of the suspension.

15. The DSA suspension of claim 13 wherein the stainless steel bridge connectors are connected to the stainless steel ribbons at a position that is within a range of 0.05 to 0.25 mm distal of a dimple center point of the suspension.

16. The DSA suspension of claim 13 wherein the stainless steel bridge connectors are connected to the stainless steel ribbons at a position that is distal of a dimple center point of the suspension, and such that the head slider experiences less than 0.01 gram of force per volt applied to each of the two microactuators.

17. The DSA suspension of claim 13 wherein the stainless steel bridge connectors are connected to the stainless steel ribbons at a position that is distal of a dimple center point of the suspension, and such that the head slider experiences essentially pure rotational movement without significant transverse linear movement of the head slider in response to actuation of the microactuators.

18. The DSA suspension of claim 12 wherein the stainless steel ribbons have essentially no insulating material on them over at least a majority of their lengths.

19. The DSA suspension of claim 12 wherein the microactuators are each mounted at an angle of between 2 and 12 degrees with respect to a longitudinal axis of the suspension, the second ends of the microactuators being located closer to a central longitudinal axis of the suspension than the first ends of the microactuators.

20. A dual stage actuator (DSA) type suspension for a disk drive, the suspension comprising:
 a load beam;
 a flexure connected to the load beam, the flexure having a rigid portion and a gimbaled slider tongue to which a head slider is mounted;
 first and second microactuators attached at first ends thereof to the rigid flexure portion;
 first and second flexible connectors connecting from the microactuators to the slider tongue, such that when the first and second microactuators expand and contract, respectively, the flexible connectors push and pull against the slider tongue to effect rotational movement of the head slider, the flexible connectors being sufficiently flexible to allow such rotational movement.

* * * * *